Feb. 27, 1968        D. C. ANDREASSON         3,370,489
                          REAMER
                     Filed Feb. 9, 1966
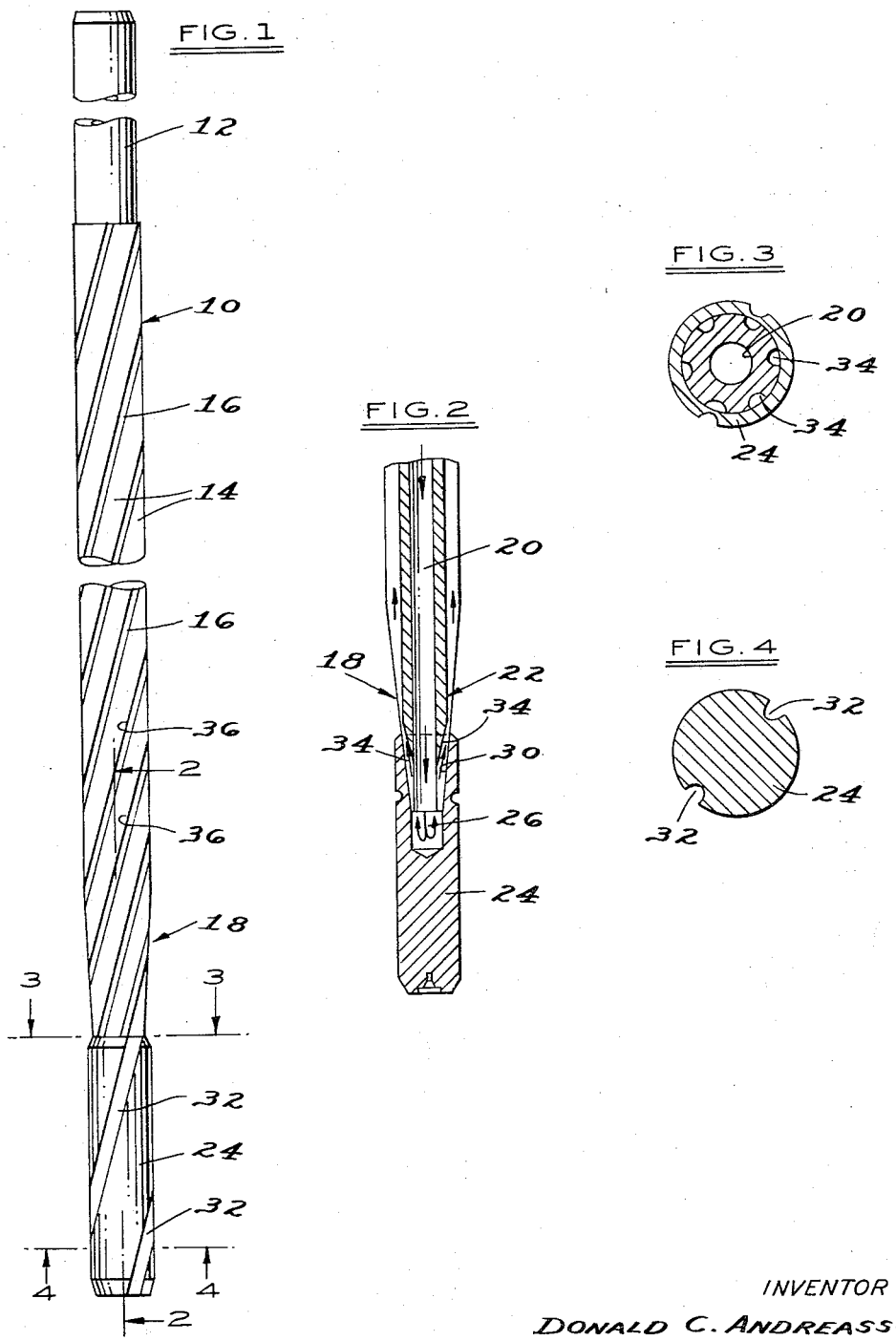
INVENTOR
DONALD C. ANDREASSON
BY
Barnes, Kisselle, Raisch & Choate
ATTORNEYS

United States Patent Office 3,370,489
Patented Feb. 27, 1968

3,370,489
REAMER
Donald C. Andreasson, Birmingham, Mich., assignor to Detroit Reamer & Tool Company, Birmingham, Mich., a corporation of Michigan
Filed Feb. 9, 1966, Ser. No. 526,281
4 Claims. (Cl. 77—72)

This invention relates to a reamer and more particularly to a reamer which can be utilized for reaming out steel tubing used particularly for the food industry. Since this tubing may come in long lengths of 50 to 100 feet, it is desirable to ream the inner surface of the ends so that a smooth joint can be provided for joining additional tube or for attaching fixtures of any kind. In the handling of food, it is important that the tube surface permit a smooth, uninterrupted flow to prevent the accumulation of food stuffs at any ridges or abrupt interruptions in the surface.

It is another object to provide a reamer which will remove chips from the tube as it operates to prevent accumulation of chips within the tube and thus avoid a difficult cleaning operation.

It is an object of the present invention to provide a reamer for reaming tubes and also for any other reaming purpose where back flow of chips is extremely important.

It is a further object of the invention to provide a suitable coolant flow path with a minimum of special manufacturing operations, thus creating a tool which is simple in its construction and inexpensive to manufacture.

Other objects and features of the invention will be apparent in the following description where the manner of making and using the tool is described and there is set forth the best mode contemplated for carrying out the invention.

Drawings accompany the disclosures and the various views thereof may be briefly described as:

FIGURE 1, an elevation of a completed reamer.

FIGURE 2, an axial section of the working end of the tool taken at line 2—2 of FIGURE 1.

FIGURE 3, a sectional view on line 3—3 of FIGURE 1.

FIGURE 4, a sectional view on line 4—4 of FIGURE 1.

Referring to the drawings: A reamer is shown in FIGURE 1 having a shank portion 10 with a driving end 12 and provided with alternate flutes 14 and lands 16. In the instance shown, the flutes and lands are in spiral configuration around the shank. The shank has a tapered portion 18 in the working end and the shank itself is provided with an interior coolant passage 20. The flutes 16 in the tapered portion continue to the end of the tool although they become somewhat shallower at an area indicated at 22 in FIGURE 2. The lands have a cutting edge on the leading edge thereof.

A pilot 24 is provided at the working end of the tool having a diameter somewhat smaller than the general diameter of the shank and provided with an axial central recess 26 tapering outwardly in an area 30. The pilot is preferably about the size of the inner diameter of the tube or hole to be reamed. This taper portion 30 fits the tapered end 18 of the shank 10 and inserts into the tapered portion 30 leaving the end portion 26 open. In assembly, the pilot 24 is brazed to the end of the shank 10 in concentric relation thereto. The pilot is provided with a pair of flutes 32 at 180° apart on the surface for the purpose of picking up any dirt or foreign particles that may be in the tube as the pilot enters, thus providing a recess for the accumulation of these particles to prevent rubbing or galling of the tube.

In operation, the reamer is inserted into the tube end, and with the pilot 24 advancing into the tube, the reamer gradually starts cutting into the tube wall as the tapered portion reaches the inner diameter of the tube. At the same time, coolant is being forced axially down the coolant passage 20 and it is reversed in its direction at the recess 26 in pilot 24 and moves in a direction axially of the reamer out of the passages 34 which are formed by the inner surface of the tapered recess 30 and the residual flutes at the tapered portion 18 of the shank. Thus, there is no necessity for drilling any holes in either the pilot or the shank for coolant passages.

In the construction shown, with the pilot entering the end of the tube, and utilizing the tapered configuration, there is an abundant flow of coolant outwardly of the tube before any cutting operation starts. When the cutting edges of the lands 16, indicated for example at 36, start removing metal in the tube, the chips caused by such operation, which is a normal reaming operation, will be imemdiately moved outwardly by the coolant and carried out of the tube. Thus, when the reaming operation, which is generally approximately 6 inches into the tube, is completed the reamer can be removed and there is very little, if any, chip residue in the tube as completed. The preferable finish to be desired is a 200 micro-inch finish with an 8 to 10° taper for a smooth transition by the connecting diameters. This can readily be accomplished with the tool described.

What is claimed as new is as follows:

1. A reamer comprising:
   (a) a fluted shank having an interior coolant passage and exterior alternate, axially extending flutes and lands, each land having a leading cutting edge and said shank being tapered down at one end from a primary diameter to a smaller secondary diameter,
   (b) a pilot at the small end of said shank having a diameter less than the primary diameter and having a blind, axial recess receiving a portion of said tapered end, said flutes forming, with the walls of said recess, axial passages,
      wherein coolant entering said recess is reversed in a direction to flow axially back through said axial passages into said flutes and to said cutting edges to flush out metal removed in a reaming operation.

2. A reamer comprising:
   (a) a fluted shank with a driving end and a working end having an interior coolant passage and exterior alternate, axially extending flutes and lands, each land having a leading cutting edge,
   (b) a pilot at the working end of said shank having a blind, axial recess receiving a portion of the working end of said shank, said recess having an axial length greater than that portion of the working end received, said flutes forming with the walls of said recess, axial passages leading outward from said recess to said flutes,
      wherein coolant entering said recess is reversed in a direction to flow axially back through said axial passages into said flutes to cool and lubricate said cutting edges and flush out metal removed in said reaming operation.

3. A device as defined in claim 2 in which said pilot is dimensioned to substantially fit in a hole to be reamed and has an axially extending groove therein to pick up foreign particles to prevent scoring.

4. A reamer comprising:
   (a) a fluted shank with a driving end and a working end having an interior coolant passage and exterior alternate, axially extending flutes and lands, each land having a leading cutting edge, (b) an end cap at the working end of said shank having a blind, axial recess receiving a portion of the working end of said shank and connected to said coolant passage, said flutes forming with the walls of said recess, axial passages leading outward from said recess to said flutes, wherein coolant entering said recess from said coolant passage is reversed in a direction to flow axially back through said axial passages into said flutes to cool and lubricate said cutting edges and flush out metal removed in said reaming operation.

References Cited

UNITED STATES PATENTS 2,867,140  1/1959  Getts _____ 77—68 XR
3,028,772  4/1962  Mossberg _____ 77—58.1

FRANCIS S. HUSAR, *Primary Examiner.*